US012695356B2

(12) United States Patent
Barthelemy et al.

(10) Patent No.: US 12,695,356 B2
(45) Date of Patent: Jul. 28, 2026

(54) METHOD AND SYSTEM FOR RAPID STARTING OF A COMBUSTION ENGINE IN A MULTI-ENGINE AIRCRAFT

(71) Applicant: AIRBUS HELICOPTERS, Marignane Cedex (FR)

(72) Inventors: Romain Barthelemy, Aix en Provence (FR); Marc Gazzino, Marseilles (FR); Mounir Amokrane, Rognac (FR); Jean-François Logeais, Marseilles (FR)

(73) Assignee: AIRBUS HELICOPTERS (FR)

( * ) Notice: Subject to any disclaimer, the term of this patent is extended or adjusted under 35 U.S.C. 154(b) by 0 days.

(21) Appl. No.: 19/002,420

(22) Filed: Dec. 26, 2024

(65) Prior Publication Data

US 2025/0309728 A1     Oct. 2, 2025

(30) Foreign Application Priority Data

Mar. 29, 2024     (FR) ...................................... 2403318

(51) Int. Cl.
| | |
|---|---|
| *H02K 7/18* | (2006.01) |
| *F02C 7/268* | (2006.01) |
| *F02C 7/36* | (2006.01) |
| *H02P 1/02* | (2006.01) |

(52) U.S. Cl.
CPC ........... *H02K 7/1815* (2013.01); *F02C 7/268* (2013.01); *F02C 7/36* (2013.01); *H02P 1/02* (2013.01); *F05D 2260/85* (2013.01)

(58) Field of Classification Search
CPC .... F02C 7/268; F02C 7/36; F02C 7/26; F02C 6/02; F05D 2220/76; F05D 2260/85; H02P 1/02; H02P 9/14; H02P 9/48; H02P 2101/30; H02K 7/1815; H02K 7/118; H02K 7/1185
See application file for complete search history.

(56) References Cited

U.S. PATENT DOCUMENTS

| | | | |
|---|---|---|---|
| 7,513,119 B2 | 4/2009 | Zielinski et al. | |
| 2010/0038961 A1* | 2/2010 | Divito ................... | F02N 11/006 290/46 |
| 2017/0184032 A1* | 6/2017 | Poumarede ............... | F02C 9/42 |

(Continued)

FOREIGN PATENT DOCUMENTS

| | | |
|---|---|---|
| FR | 3019214 A1 | 10/2015 |
| FR | 3121293 A1 | 9/2022 |

OTHER PUBLICATIONS

French Search Report for French Application No. FR2403318, Completed by the French Patent Office, Dated Oct. 15, 2024, 10 pages.

*Primary Examiner* — Thomas P Burke
(74) *Attorney, Agent, or Firm* — Brooks Kushman P.C.

(57) ABSTRACT
A starting and electrical generation system for a main engine. A starter-generator comprises a first polyphase winding and a second polyphase winding jointly setting in motion a transmission shaft in a start mode, the starting and electrical generation system comprising a first main electrical power source connected on command by a first electrical connection to at least one first main electrical converter electrically connected to the first winding and a second main electrical power source connected on command by a second electrical connection to at least one second main electrical converter electrically connected to the second winding.

20 Claims, 7 Drawing Sheets

(56) References Cited

U.S. PATENT DOCUMENTS

| | | | | |
|---|---|---|---|---|
| 2018/0187604 A1* | 7/2018 | Poumarede | ............. | F02C 3/107 |
| 2018/0216526 A1* | 8/2018 | Dalal | ........................ | F02C 7/32 |
| 2019/0181786 A1* | 6/2019 | Singh | .................... | B64D 41/00 |
| 2019/0376405 A1* | 12/2019 | Lavoie | ...................... | H02J 4/00 |
| 2021/0071583 A1 | 3/2021 | Bruce et al. | | |

* cited by examiner

Fig.6

First main electrical
power source

METHOD AND SYSTEM FOR RAPID STARTING OF A COMBUSTION ENGINE IN A MULTI-ENGINE AIRCRAFT

CROSS REFERENCE TO RELATED APPLICATION

This application claims priority to French Patent Application No. FR 24 03318 filed on Mar. 29, 2024, the disclosure of which is incorporated in its entirety by reference herein.

TECHNICAL FIELD

The present disclosure relates to a method and system for rapidly starting a combustion engine in a multi-engine aircraft.

BACKGROUND

An aircraft may comprise a plurality of combustion engines for setting in motion a mechanical system, and for example a mechanical system rotating at least one rotor on a helicopter.

The combustion engines may take the form of a turboshaft engine, possibly with a free turbine. A free-turbine turboshaft engine comprises a gas generator provided with a compressor, a combustion chamber and a high-pressure expansion assembly constrained to rotate with the compressor. The compressor may be provided with one or more compression stages. Likewise, the expansion assembly may comprise one or more expansion turbines. In addition, the free-turbine turboshaft engine comprises at least one so-called "free" low-pressure working turbine, i.e., one that is mechanically independent in rotation from the compressor of the high-pressure expansion assembly, rotating a power shaft.

Furthermore, the power plant comprises an engine starting system provided with a starter-generator. A starter-generator comprises an electrical machine mechanically connected to a moving assembly of the associated engine. When a turboshaft engine is present, the electrical machine includes a shaft that is constrained to rotate with the compressor and the high-pressure expansion assembly of the gas generator.

Such an electrical machine can operate in an electrical motor mode and in an electrical generator mode. When the electrical motor mode is applied, the electrical machine transforms electrical power received from a source into mechanical energy in order to participate in the setting in motion of the moving assembly of the associated combustion engine, for example during a starting phase. When the electrical generator mode is applied, the electrical machine transforms mechanical energy taken from the associated combustion engine into electrical power that can be transmitted to an electrical network of the aircraft.

Thus, a rotary-wing aircraft may comprise a power plant having a plurality of combustion engines for setting in motion a power transmission system, this power transmission system in particular rotating at least one rotary wing.

The power plant may optionally operate in an asymmetric operating mode by placing one of the engines on standby during certain operating phases of the aircraft.

On a rotary-wing aircraft, during the asymmetric mode, at least one active engine is regulated to ensure the rotating of the rotary wing by developing non-zero active driving power with its power shaft. On the other hand, at least one passive engine is put on standby, for example by being switched off or regulated to develop with its power shaft an idling power lower than the active driving power. The combustion chamber of the passive engine may be supplied with fuel, or is not supplied with fuel. The passive engine is also desynchronized from the rotary wing by means of a free-wheel.

In such an asymmetric mode, if a fault occurs and causes the active engine to stop, the engine on standby must be reactivated quickly.

Therefore, the starter-generators are designed to obtain a reasonable starting time with a standard level of availability during the initial starting of the combustion engines on the ground, and a fast starting time with a high level of availability for reactivating a standby engine.

The combination of the constraints on starting time and the value of the voltage of the electrical network supplying the electrical machine can lead to a starting system having a non-negligible mass.

Document FR3121293 describes a power plant provided with a combustion engine and an electric starter. The power plant also has a main electrical power source that may, for example, comprise an electric battery, and a secondary electrical power source that may also, for example, comprise an electric battery. Therefore, a connector electrically connects the main electrical power source and the secondary electrical power source in series with the electric starter during a quick start phase.

Document FR3019214 discloses a starting system that is electrically independent of an on-board network, for starting-up two turboshaft engines of an aircraft. According to one embodiment, this starting system comprises a first electrical machine connected to a first turboshaft engine and a second electrical machine connected to a second turboshaft engine. The first electrical machine is electrically connected to a first DC-to-AC electrical converter by a first electrical connector and to a second DC-to-AC converter by a second electrical connector. Similarly, the second electrical machine is electrically connected to the first converter by a third electrical connector and to the second converter by a fourth electrical connector. The first electrical converter is further electrically connected to a first electrical power source via a first DC bus, and the second power converter is electrically connected to a second main electrical power source via a second DC bus.

Document US 2021/071583 A1 describes an engine comprising a low-pressure compressor, a high-pressure compressor, a combustion chamber, a high-pressure turbine and a low-pressure turbine. Together, the high-pressure compressor, the high-pressure turbine and the associated interconnection shaft form part of a high-pressure assembly. Similarly, the low-pressure compressor, the low-pressure turbine, and the associated interconnection shaft form part of a low-pressure assembly. In addition, the engine comprises a first rotary electrical machine mechanically coupled to the high-pressure assembly, and a second rotary electrical machine mechanically coupled to the low-pressure assembly.

Document U.S. Pat. No. 7,513,119 B2 is also known.

SUMMARY

An object of the present disclosure is therefore to provide an innovative starting and electrical generation system for a multi-engine aircraft, optionally making it possible to obtain a reasonable engine start time with a standard level of availability when initially starting-up combustion engines on the ground, and/or a rapid start time with a high level of availability for reactivating a standby engine when applying an asymmetric operating mode.

The disclosure thus relates to a starting and electrical generation system for a main combustion engine of an aircraft, the starting and electrical generation system comprising a starter-generator provided with a transmission shaft, the starter-generator being operable in a motor mode for setting in motion a main moving assembly of the main engine with the transmission shaft, and a generator mode for generating electrical power by having the transmission shaft set in motion by said main moving assembly.

The starter-generator comprises a first winding that is polyphase and a second winding that is polyphase, generating magnetic fields to create respective motor torques jointly setting in motion the transmission shaft in a start mode of the motor mode, the starting and electric generation system comprising a first main electrical power source connected on command by a first electric connection to at least a first main electrical converter electrically connected to the first winding, and a second main electrical power source connected on command by a second electric connection to least a second main electrical converter electrically connected to the second winding.

The first polyphase winding and the second polyphase winding are assemblies of polyphase coils. The first polyphase winding and the second polyphase winding therefore each comprise several electrical coils.

As a result, the starter-generator is electrically powered during the start mode by two reversible DC-to-AC electrical converters, i.e., directly without passing through an electrical connection/disconnection component. The two electrical converters are connected on command, via electrical connection/disconnection members, to two separate and independent electrical sources. These electrical sources may already be present on a standard aircraft, and may not result in additional mass.

In addition, this use of two windings that are electrically powered in parallel, or even independently according to the variant, makes it possible to sum the electromagnetic torques produced for driving the transmission shaft. Therefore, the transmission shaft can develop a large mechanical power. With such a large mechanical power, the starting-up of the main engine can be fast, i.e., a start obtained in less than 10 seconds for example. Such a quick start is particularly advantageous in flight when the main engine is on standby in a multi-engine aircraft, for example when the asymmetric mode described above is applied.

In the event of a fault on one of the electrical power lines electrically powering the first winding and the second winding, the other electrical power line and the other winding make it possible to obtain sufficient mechanical power to start the main engine in a degraded mode. Such a fault may be a sudden electrical short-circuit, and, for example, may result from a short-circuit directly between the phases of a winding. The system is therefore secured and offers the possibility of starting the engine with a high level of availability, especially in flight.

Indeed, each winding is dimensioned to obtain on its own, and even in the presence of a braking torque generated by the other winding due to a short-circuit current, for example between the phases of this other winding, a mechanical power allowing the main engine to be started.

Thus, the starting and electrical generation system uses two separate, segregated electrical power sources, optionally of different types and/or already used elsewhere on the aircraft, to electrically power a starter-generator during a start. This architecture makes it possible to obtain a compromise between restart time, mass and reliability, that is advantageous for the targeted functions.

The starting and electrical generation machine can be a pure starter that can only operate according to the motor mode, for example to start a powerful engine requiring significant mechanical power.

The starting and electrical generation system can also generate electrical power during an electrical power production mode by converting mechanical power taken from the main engine in operation. The starter-generator can then become a regulated voltage source, for example at 28 Volts. In this operating mode, the two electrical converters are used in parallel in order to use the entire volume of copper available, namely that of the first and second windings, and thus optimize the mass of the system.

Optionally, the two electrical converters are used to respectively electrically power two separate electrical networks. According to one example, the two electrical converters electrically power a normal electrical network and an emergency electrical network.

According to another example, the two electrical converters electrically power two separate networks with different electrical voltages. For example, one electrical converter powers an electrical network having a voltage of 28 Volts and the other electrical converter powers an electrical network having a voltage of 56 Volts for example, to power flight control actuators for example.

The starting and electrical generation system may also have one or more of the following characteristics.

According to one possibility, the first winding and the second winding may be different, for example by having different numbers of turns of windings, that generates different inductances.

Thus, each winding may be adapted to the associated main electrical power source, in particular if the source are different and/or have different characteristics, for example different voltages.

According to one possibility compatible with the preceding possibilities, the first main electrical power source may not be voltage regulated and the second main electrical power source may be voltage regulated, or the first main electrical power source and the second main electrical power source may be regulated at different voltages.

These two alternatives make it possible to control the motor torque transmitted to the main electrical machine.

According to one possibility compatible with the preceding possibilities, the first main electrical power source may comprise at least one electric battery or one thermal battery or one supercapacitor.

The main electrical power source may include several of these unregulated electrical energy storage means, thus avoiding the need to oversize an electrical energy storage means to support the starting.

Such an electric battery is usually present on an aircraft.

According to one possibility compatible with the preceding possibilities, the second main electrical power source may comprise a voltage-regulated electrical generator that is configured to be mechanically set in motion by a mechanical system.

Such an electrical generator is usually present on an aircraft.

According to a first alternative of the starter-generator, this starter-generator may comprise an electrical machine having a stator provided with the first winding and the second winding that are polyphase, with floating neutral and galvanically insulated from each other, the electrical machine comprising a rotor with buried permanent magnets with variable reluctance and constrained to rotate with the transmission shaft.

The use of two windings electrically powered in parallel makes it possible to sum the electromagnetic torques produced on the buried-permanent-magnet rotor with variable reluctance. In the event of a fault on one of the power supply lines electrically powering the two stator windings, the use of a rotor with buried permanent magnets with variable reluctance makes it possible to limit the short-circuit current possibly produced. Such an electrical machine makes it possible to reduce short-circuit currents at high speed, and therefore limits the braking torque produced and the heating of the electrical machine in the event of an internal short-circuit. Therefore, the other power supply line and the other stator winding can make it possible to obtain sufficient mechanical power to start the main engine in a degraded mode. The starter-generator is therefore robust and has a high level of reliability.

According to a second alternative of the starter-generator, this starter-generator may comprise a dual electrical machine with separate excitations, the dual electrical machine with separate excitations comprising a stator provided with the first winding and the second winding, the dual electrical machine with separate excitations comprising a rotor provided with two rotor windings electrically connected to an electrical brush commutator.

The two rotor windings cooperate respectively with the first and second windings of the stator. An internal short-circuit event is managed by cutting the relevant excitation, the braking torque resulting from the short-circuit then being eliminated. The starter-generator therefore has a high level of reliability.

According to a third alternative of the starter-generator, this starter-generator may comprise a magnet starter and an electrical machine operating in generator mode and in motor mode, the magnet starter being provided with a first stator having the first winding and with a first rotor that is mechanically connected to the transmission shaft by a freewheel, the electrical machine comprising a second stator provided with the second winding and with a second rotor integral with the transmission shaft, the electrical machine being able to be an electrical machine with separate or asynchronous excitation.

Thus, the starter is only used during a start phase, whereas the electrical machine is used both during a start phase and during the electrical power production mode. The free-wheel makes it possible to isolate the starter from the electrical machine in the event of a short-circuit within one of these components. In the presence of a separately excited electrical machine, cutting the excitation may eliminate a possible short circuit. The starter-generator therefore has a high level of reliability.

According to a fourth alternative of the starter-generator, this starter-generator may comprise a dual asynchronous electrical machine comprising a stator provided with the first winding and the second winding.

The internal short-circuit is managed by taking into account the internal residual voltages of the machine.

According to a fifth alternative of the starter-generator, this starter-generator may comprise a separately excited electrical machine comprising a stator having one of the first winding and the second winding and an asynchronous electrical machine comprising a stator having the other of the first winding and the second winding.

Regardless of the nature of the starter-generator, according to one possibility compatible with the preceding possibilities, the starting and electrical generation system may include a manager configured to:

in the starting mode, electrically power the first winding via the first main electrical converter with at least the first main electrical power source, electrically power the second winding via the second main electrical converter with at least the second main electrical power source;

in a standby mode, power one of the first winding and second winding with the second main electrical power source, maintaining the first main electrical power source under load via a transverse electrical connection connected to the second electrical connection; and in an electrical power production mode, electrically connect, in parallel, the second main electrical converter and the first main electrical converter to electrically power the first main electrical power source.

The term "manager" denotes a system for carrying out the various above-mentioned actions. The manager may comprise at least one electrical center, electronic equipment of the starter-generator, a computer, contactors controlled to open or close an electrical connection, etc.

According to one possibility compatible with the preceding possibilities, the second electrical connection may comprise a main bus, and the manager may comprise:

a controller;

a first main contactor commanded by the controller and arranged on the first electrical connection; and a second main contactor commanded by the controller and arranged on the second electrical connection between the main bus and the second main electrical converter.

The first contactor and the second contactor make it possible to electrically connect, if necessary, the main electrical converters to the main electrical power sources.

Optionally, the manager may comprise:

a third main contactor commanded by the controller and arranged between the main bus and a connection configured to be electrically connected to a complementary electrical connection of an additional electrical circuit;

a fourth main contactor commanded by the controller and arranged on a transverse electrical connection, the transverse electrical connection extending from the second electrical connection to the first electrical connection between the first main contactor and the first main electrical power source; and a fifth main contactor commanded by the controller and arranged on an electrical line connecting the first electrical connection and the second electrical connection between, firstly, the second main contactor and the second main electrical converter and, secondly, between the first main contactor and the first main electrical converter.

These various contactors make it possible to implement the various operating modes mentioned above.

According to a variant, the third main contactor is arranged on the second electrical connection, an additional contactor being able to be arranged between the third main contactor and the second source of electrical power.

According to another variant making it possible to place the main electrical power sources in parallel, an additional electrical connection connects the first electrical connection and the second electrical connection. This additional electrical connection is connected to the second electrical connection between the second main electrical power source and the main bus, and to the first electrical connection between the first main electrical power source and the first main contactor. In addition, the first electrical connection comprises an additional contactor between its connection to the additional electrical connection and its connection to the transverse electrical connection.

According to one possibility compatible with the preceding possibilities, the first main electrical power source and the second main electrical power source may have different voltages.

The disclosure further relates to an aircraft provided with a main combustion engine and with at least one additional combustion engine connected to a mechanical system setting in motion at least one rotary wing or one rotor or one propeller, the additional engine being connected to an additional electrical machine that can operate according to a motor mode for setting in motion an additional moving assembly of the additional engine, and a generator mode for generating electrical power by being set in motion by said additional moving assembly, the additional electrical machine being electrically connected to an additional electrical converter that is connected by an additional electrical connection to an additional electrical power source.

This aircraft comprises a starting and electrical generation system of the type described above for the main engine.

According to one possibility, the mechanical system can comprise a gearbox connected to the main engine and to the additional engine, and the second main electrical power source can be set in motion by the gearbox.

The gearbox can be mechanically connected to a rotary wing and/or a propeller and/or a rotor for controlling the yaw movement, for example.

Furthermore, the disclosure also relates to a method for starting a combustion engine and for generating electrical power with a starting and electrical generation system of the above-described type.

This method comprises:
- a starting mode comprising the following steps: electrically powering the first winding via the first main electrical converter with at least the first main electrical power source, electrically powering the second winding via the second main electrical converter with at least the second main electrical power source;
- a standby mode comprising the following steps: powering one of the first winding and the second winding with the second main electrical source, power maintaining the first main electrical power source under load via a transverse electrical connection connected to the second electrical connection; and
- an electrical power production mode comprising the following steps: electrically connecting, in parallel, the second main electrical converter and the first main electrical converter and connecting them to the first main electrical power source.

BRIEF DESCRIPTION OF THE DRAWINGS

The disclosure and its advantages appear in greater detail from the following description of examples given by way of illustration with reference to the accompanying figures, wherein:

FIG. 6 shows the starting and electrical generation system of FIG. 1 during a standby mode;

DETAILED DESCRIPTION

Elements present in more than one of the figures are given the same references in each of them.

Figure 1:
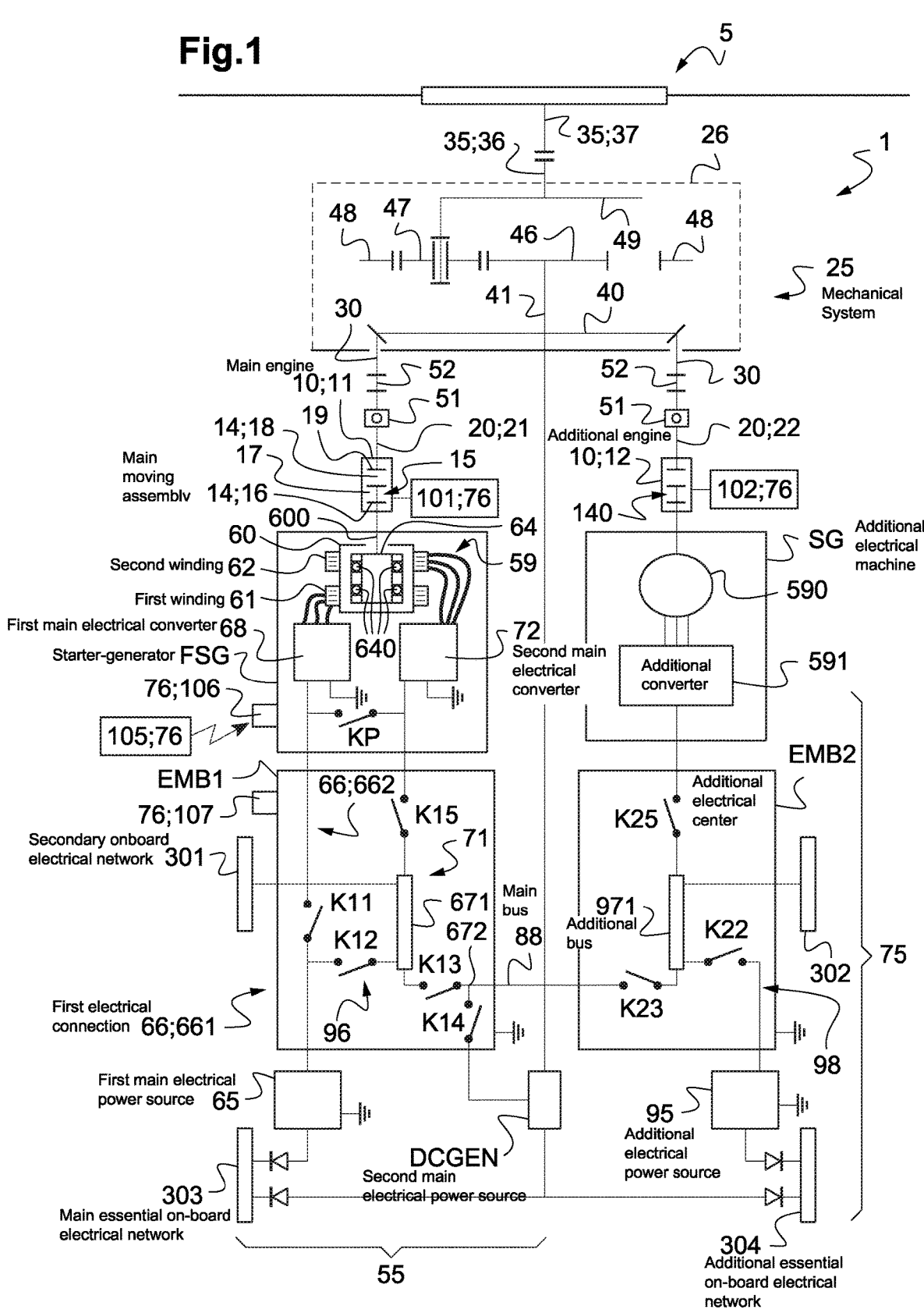
FIG. 1 shows a starting and electrical generation system for a main engine at standstill.

FIG. 1 shows a starting and electrical generation system 55 for a main combustion engine 11 of an aircraft 1.

Such an aircraft 1 thus comprises a power plant provided with the main engine 11, or even with at least one additional combustion engine 12. Reference 10 denotes any combustion engine, references 11 and 12 respectively denoting a main engine and an additional engine if it is necessary to identify a specific engine 10.

The main engine 11 and any additional engine(s) 12 can optionally be controlled by respective engine regulation systems 101, 102. Each engine regulation system 101, 102 may be of a standard type, and may thus comprise a fuel metering device and various sensors connected to an engine computer, the engine computer being configured to control the fuel metering device at least as a function of a signal emitted by one or more sensors. The engine regulation systems are not described in more detail so as not to complicate the present description, these engine regulation systems being well known to a person skilled in the art.

According to one example, at least one engine 10 may be a turboshaft engine. For example, the main engine 11 comprises a turboshaft engine provided with a gas generator 15. The gas generator 15 has at least one compression turbine 16, a combustion chamber 17 into which fuel is injected and at least one expansion turbine 18 constrained to rotate with the one or more compression turbines 16. The one or more compression turbines 16 are mechanically connected in rotation to the one or more expansion turbines 18 to form a main moving assembly 14. Moreover, the turboshaft engine may comprise at least one free turbine 19 that sets a power shaft 21 of the engine in motion directly or indirectly.

Similarly, the additional engine 12 may be a turboshaft engine provided with an additional moving assembly 140 and a power shaft 22. Reference 20 denotes any power shaft, references 21, 22 denoting particular shafts of the two engines 11, 12 respectively.

Irrespective of the type of engines, each engine 10 therefore comprises a power shaft 20 and a moving assembly 14, 140.

Furthermore, the one or more power shafts 20 are mechanically connected to a mechanical system 25 to set them in motion. For example, the mechanical system 25 may be connected to at least one aerodynamic rotary member 5. This aerodynamic rotary member 5 may, in particular, be a rotary wing according to the example, a rotor for controlling yaw movement or a propeller.

By way of illustration, the mechanical system 25 may be provided with a gearbox 26 that is mechanically interposed between the engines 10 and the rotary wing 5. For example, the gearbox 26 comprises a rotor mast 35, provided with one or more collinear shafts 36, 37 connected to the aerodynamic rotary member 5. The gearbox 26 may be provided with one input shaft 30 for each engine 10 and various gears arranged between the input shafts 30 and the rotor mast 35. According to an example given by way of illustration, each input shaft 30 is engaged on a large wheel 40. This large wheel 40 is then mechanically connected by an internal shaft 41 to a sun gear 46 of a power reduction stage 45. Planet gears 47 are then engaged firstly on the sun gear 46 and on a toothed ring gear 48 that is stationary in the frame of reference of the aircraft 1. In addition, the planet gears 47 are carried by a planet carrier 49 constrained to rotate with the rotor mast 35. Each input shaft 30 is then rotated directly by a power shaft 20 of an engine 10, or via a respective mechanical input train. The mechanical system 25, and according to the example illustrated a mechanical input train, may comprise at least one freewheel 51, and/or at least one connecting shaft 52, and/or at least one connector allowing misalignments, etc.

The literature describes various types of gearboxes and various kinematic trains, the example described being given solely by way of illustration.

Independently of the nature of the mechanical system 25 and the presence or absence of one or more additional engines 12, the starting and electrical generation system 55 comprises a starter-generator FSG operable in a motor mode MOT for setting in motion the main movable assembly 14 of the main engine 11 and a generator mode GEN for generating electrical power by being set in motion by said main movable assembly 14.

Thus, the starter-generator FSG comprises a transmission shaft 600 connected to the main moving assembly 14.

In addition, the starter-generator FSG comprises a first polyphase winding 61 and a second polyphase winding 62. The coils of the first winding 61 and second winding 62 are electrically connected to a first main electrical converter 68 and a second main electrical converter 72, respectively.

When the first winding 61 and the second winding 62 are electrically powered, the first winding 61 and the second winding 62 create magnetic fields that jointly rotate the transmission shaft 600. Conversely, during the generator mode GEN, the transmission shaft 600 is set in motion by the main moving assembly 14, that makes it possible to generate electrical power.

Such a starter-generator FSG allows the implementation of various operating modes. These operating modes include: i) a starting mode MODRAP wherein the first winding 61 and the second winding 62 are electrically powered to jointly rotate the transmission shaft 600, ii) a standby mode MODVEIL wherein only one of the first winding 61 and the second winding 62 is electrically powered to rotate the transmission shaft 600, iii) a power production mode MODPROD wherein the first winding 61 and the second winding 62 generate electrical power when the transmission shaft 600 is rotated by the main engine 11, via the main moving assembly 14.

FIGS. 1 to 4 show various embodiments of a starter-generator FSG.

According to FIG. 1, the starter-generator FSG comprises an electrical machine 59 having a stator 60 provided with the first winding 61 and the second winding 62. The first winding 61 and the second winding 62 are for example three-phase, with a floating neutral and galvanically isolated from each other. In addition, the electrical machine 59 comprises a rotor 64 with buried permanent magnets 640, having variable reluctance and integral with the transmission shaft 600. The permanent magnets 640 are embedded in the rotor 64.

Figure 2:
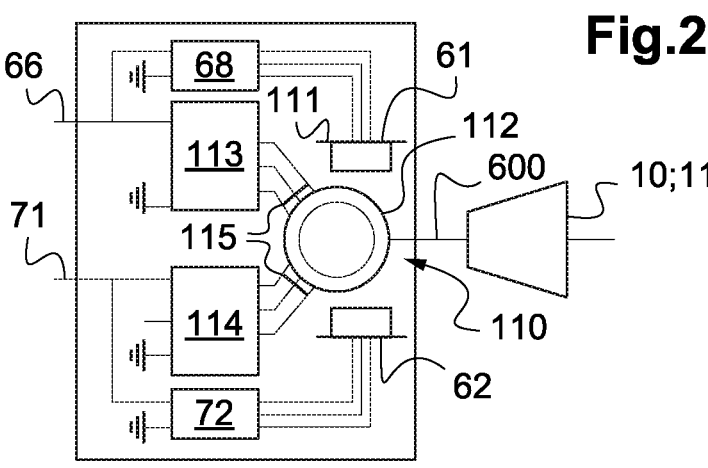
FIG. 2 shows an example of a starter-generator according to the disclosure.

According to the schematic example of FIG. 2, the starter-generator FSG comprises a dual electrical machine with separate excitations 110. This dual electrical machine with separate excitations 110 comprises a stator 111 provided with the first winding 61 and the second winding 62. In addition, the dual electrical machine with separate excitations 110 comprises a rotor 112 provided with two rotor windings facing the first winding 61 and the second winding 62. The two rotor windings are electrically connected by an electrical brush commutator 115 to two additional converters 113, 114, in parallel electrically and respectively to first and second main converters 68, 72.

Figure 3:
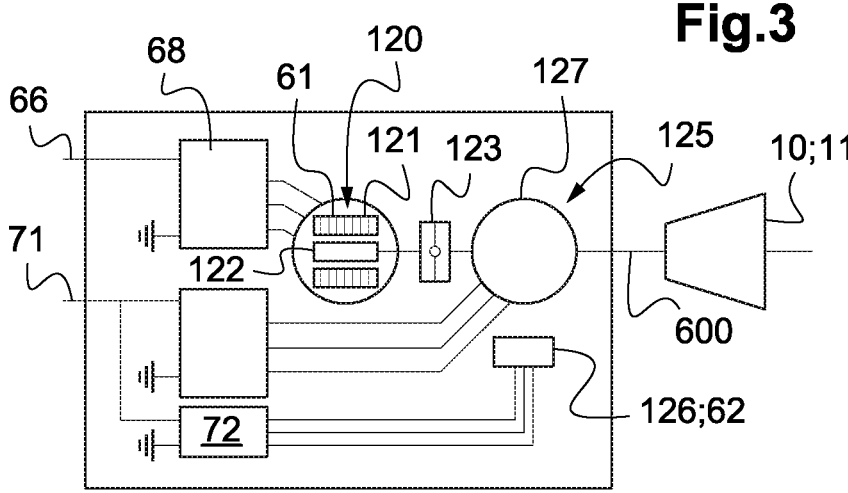
FIG. 3 shows an example of a starter-generator according to the disclosure.

According to the schematic example of FIG. 3, the starter-generator FSG comprises a conventional magnet starter 120 and an electrical machine 125 operating in generator mode and in motor mode. The magnet starter 120 is then provided with a first stator 121 having the first winding 61 and with a first rotor 122 provided with at least one permanent magnet and mechanically connected to the transmission shaft 600, in particular by a free-wheel 123, or even via the electrical machine 125. This electrical machine 125 comprises a second stator 126 provided with the second winding 62 and with a second rotor 127 integral with the transmission shaft 600, the electrical machine 125 optionally being a separately excited electrical machine of the type shown in FIG. 2 or asynchronous.

During the starting mode MODRAP, the magnet starter 120 and the electrical machine 125 jointly set in motion the transmission shaft 600. In the event of failure of one of these two components, the other component ensures the starting.

During the standby mode MODVEIL, only the electrical machine 125 is for example used to set in motion the transmission shaft 600.

During the power production mode MODPROD, only the electrical machine 125 produces electrical power. The magnet starter 120 is then disconnected from the transmission shaft 600 by the free-wheel 123.

A variant of this embodiment comprises a separately excited electrical machine comprising a stator having one of the first winding and the second winding, and an asynchronous electrical machine comprising a stator having the other of the first winding and the second winding.

Figure 4:
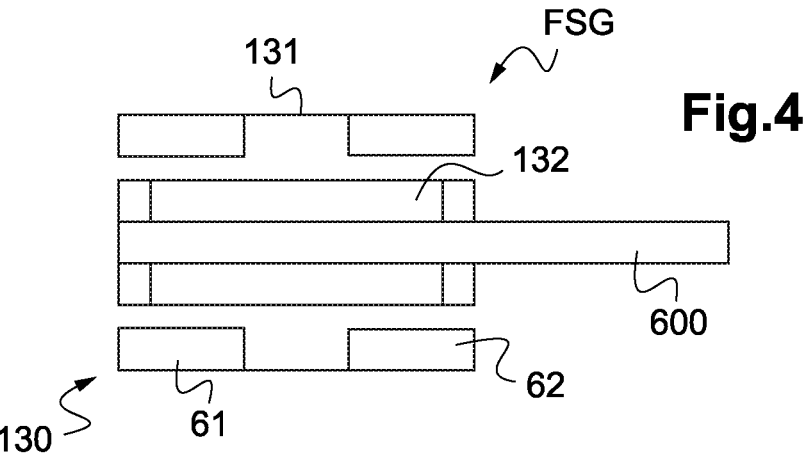
FIG. 4 shows an example of a starter-generator according to the disclosure.

According to the schematic example of FIG. 4, the starter-generator FSG comprises a dual asynchronous electrical machine 130. This dual asynchronous electrical machine 130 comprises a stator 131 provided with the first winding 61 and the second winding 62. In addition, the dual asynchronous electrical machine 130 comprises a rotor 132 integral with the transmission shaft 600. This rotor 132 may be of the type known as a "squirrel-cage rotor".

Figure 5:
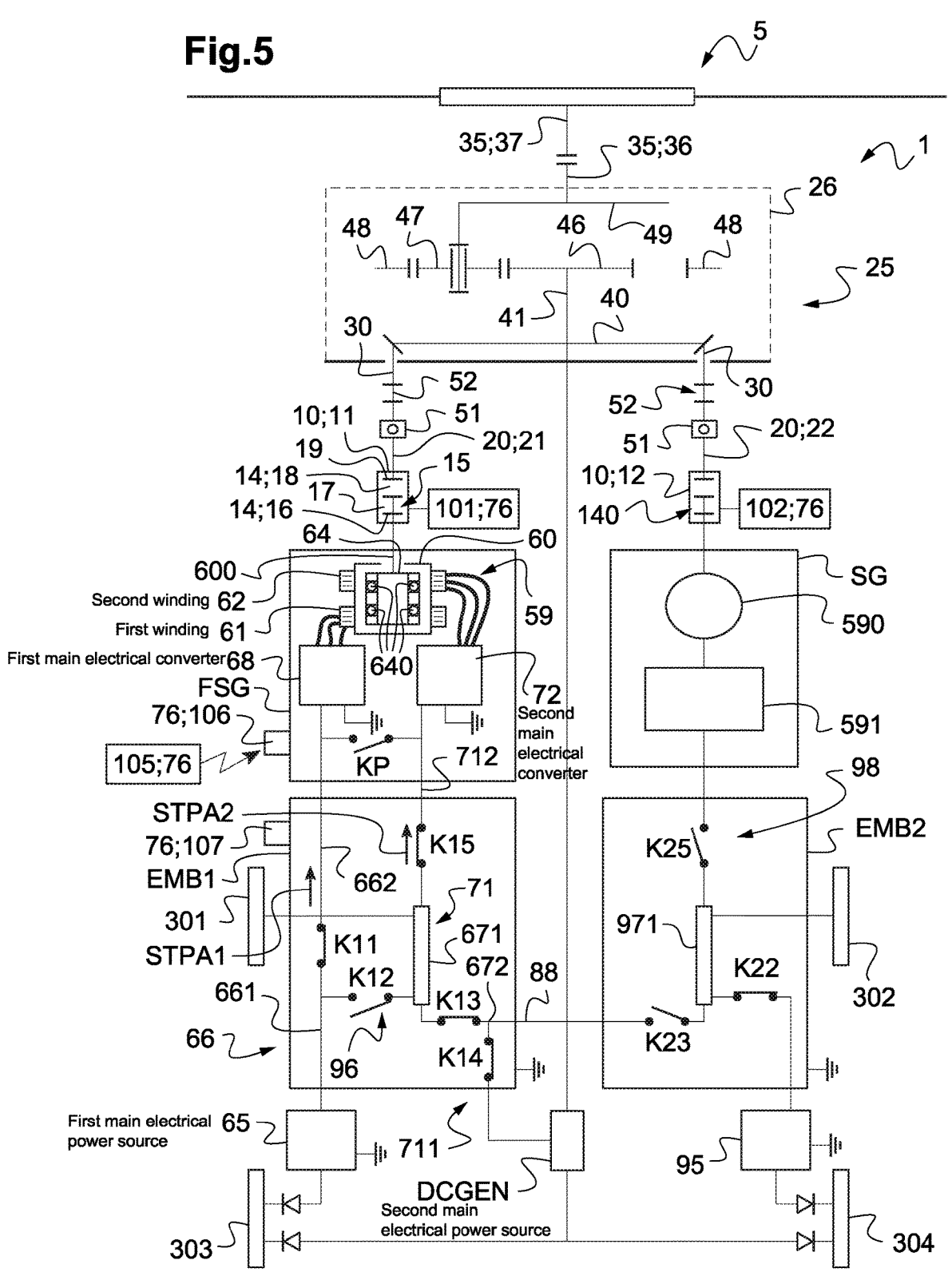
FIG. 5 shows the starting and electrical generation system of FIG. 1 during a starting mode.

Regardless of the embodiment of the starter-generator FSG and with reference to FIG. 5 for example, the system 55 may comprise an additional circuit comprising an additional electrical machine SG, for example of the same type as the main electrical machine or of a standard type, connected to the additional engine 12. This additional electrical machine SG may comprise an additional electrical machine 590 connected to an additional converter 591. The additional converter 591 may be connected by an additional electrical connection 98 to an additional electrical power source 95. For example, the additional electrical power source 95 comprises at least one electric battery or one thermal battery or a supercapacitor. Optionally, the additional electrical power source 95 is connected to an additional essential on-board electrical network 304 electrically powering one or more consumers.

In general, the terms "electrical connection" and "electrical line" denote assemblies that may comprise at least one electrical wire or track, at least one electrical contactor, at least one electrical bus, etc.

For example, the additional electrical connection 98 comprises an additional electrical center EMB2. This additional center EMB2 comprises an additional bus 971 connected by a first additional contactor K25 to the additional converter 591, and by a second additional contactor K22 to the additional electrical power source 95. The additional bus 971 may be connected to a complementary electrical connection 88 connected to the electrical circuit cooperating with the starter-generator FSG. This complementary electrical connection 88 is provided with a third additional contactor K23. Finally, the additional bus 971 may be connected to a secondary electrical network 302 of the aircraft 1. The additional contactors K22, K23, and K25 are controlled by conventional electronics of the additional electrical center EMB2.

Regardless of the embodiment of the starter-generator FSG and regardless of the possible presence of the additional circuit, the starting and electrical generation system 55 comprises a first main electrical power source 65. The first main electrical power source 65 is connected on command by a first electrical connection 66 at least to the first main electrical converter 68. Optionally, the first main electrical power source 65 is connected to a main essential on-board electrical network 303 electrically powering one or more consumers.

In addition, the starting and electrical generation system 55 comprises a second main electrical power source DCGEN. The second main electrical power source DCGEN is connected on command by a second electrical connection 71 at least to the second main electrical converter 72. Optionally, the second main electrical power source DCGEN is connected to the two main and additional essential on-board electrical networks 303, 304.

For example, the second main electrical power source DCGEN is voltage regulated. Thus, the second main electrical power source DCGEN may comprise an electrical generator engaged on the mechanical system 25, and possibly on the gearbox 26 or even on a shaft integral with the large wheel 40 according to the illustrated example.

Optionally, the first main electrical power source 65 is not voltage regulated. For example, the first main electrical power source 65 comprises an electric battery or a thermal battery or a supercapacitor.

Alternatively, the first main electrical power source 65 and the second main electrical power source DCGEN may be regulated at different electrical voltages.

The first electrical connection 66 and the second electrical connection 71 may pass through a main electrical center EMB1.

According to another aspect, the starting and electrical generation system 55 may include a manager 75 configured to apply a method according to the disclosure for starting a combustion engine and generating electrical power.

The manager 75 may comprise a controller 76. The controller 76 may comprise at least one processor for applying the method of the disclosure, by means of a software program and a logic circuit or an equivalent. At least one processor may comprise one of the following elements: a computer dedicated or not to this application, a first electronics 107 of the main electrical center EMB 1, a second electronics 106 of the starter-generator FSG, and/or a computer of an engine regulation system 101, 102.

In addition, the manager 75 may comprise a human-machine interface 105 enabling a pilot of the aircraft 1 to select the operating mode to be applied, for example a starting mode MODRAP, a standby mode MODVEIL, or even an electrical power production mode MODVEIL. For example, this human-machine interface 105 is in wired or wireless connection with the controller 76. Optionally, this human-machine interface 105 may comprise a touch panel screen, a button, a keyboard, etc.

Optionally, the manager 75 may comprise at least one operation sensor monitoring an operation of the main electrical machine FSG and transmitting a measurement signal to the controller 76. For example, said at least one operating sensor comprises sensors for measuring a position, for measuring an electric current, and for measuring a temperature. The redundancy and dissimilarity of these sensors can ensure the nominal operation of the main electrical machine FSG in the event of failure of one or more of them.

Furthermore, the controller 76 can execute instructions for operating the first main electrical converter 68 and the second main electrical converter 72 depending on the mode applied. In motor mode, at least one of the first and second main electrical converters 68, 72 generates a polyphase voltage of variable amplitude and frequency, controlled to ensure control of the motor torque produced. The first main electrical power source 65 and the second main electrical power source DCGEN can generate distinct values of voltage, that means that the control of the first and second main electrical converters 68, 72 is then not synchronous. In generator mode however, the first and second main electrical converters 68, 72 are used in parallel and are synchronized.

In addition, the manager 75 may comprise a first main contactor K11 commanded by the controller 76 and arranged on the first electrical connection 66 to electrically open or close this first electrical connection 66. For example, the first electrical connection 66 comprises a first upstream wired connection 661 that extends from the first main electrical power source 65 to the first main contactor K11, and a first downstream wired connection 662 that extends from the first main contactor K11 to the first main electrical converter 68. The terms "upstream" and "downstream" are used to distinguish electrical sections of a connection in a direction chosen for convenience.

In addition, the manager 75 may comprise a second main contactor K15 commanded by the controller 76 and arranged on the second electrical connection 71 to electrically open or close this second electrical connection 71. For example, the second electrical connection 71 comprises a second upstream wired connection 711 that extends from the second main electrical power source DCGEN to the second main contactor K15, and a second downstream wired connection 712 that extends from the second main contactor K15 to the second main electrical converter 72. Optionally, the second upstream wired connection 711 includes a main bus 671. The main bus 671 is connected to the second main contactor K15, or even to a connection of the first downstream wired connection 662 that is itself connected to a secondary on-board electrical network 301.

In addition, the manager 75 may comprise:
a third main contactor K13 commanded by the controller 76 and arranged between the main bus 671 and a connection 672 configured to be electrically connected to the complementary electrical connection 88;

a fourth main contactor K12 commanded by the controller 76 and arranged on a transverse electrical connection 96, the transverse electrical connection 96 extending from the second electrical connection 71 to the first electrical connection 66 between the first main contactor K11 and the first main electrical power source 65;

a fifth main contactor KP commanded by the controller 76 and arranged on an electrical line connecting the first electrical connection 66 and the second electrical connection 71 between firstly the second main contactor K15 and the second main electrical converter 72 and secondly between the first main contactor K11 and the first main electrical converter 68, i.e., between the first downstream wired connection 662 and the second downstream wired connection 712; and a sixth contactor K14.

The various contactors mentioned may be of a standard type in order to open or close an electrical line, and may be commanded in the standard way by the controller 76.

For example, the first main contactor K11, the second main contactor K15, the third main contactor K13, the fourth main contactor K12 and the sixth contactor K14 belong to the main electrical center EMB1 and can be controlled by its electronics 107, while the fifth main contactor KP belongs to the starter-generator FSG and can be controlled by its electronics 106.

In the first variant of FIG. 5, the first downstream wire connection 662 includes only a wire connection connected to the first main electrical power source 65, the first main contactor K11, and the transverse electrical connection 96. In addition, the second upstream wire connection 711 comprises the third main contactor K13 and the sixth contactor K14, this sixth contactor K14 being arranged between the second source of electrical power DCGEN and the third main contactor K13.

Figure 6:
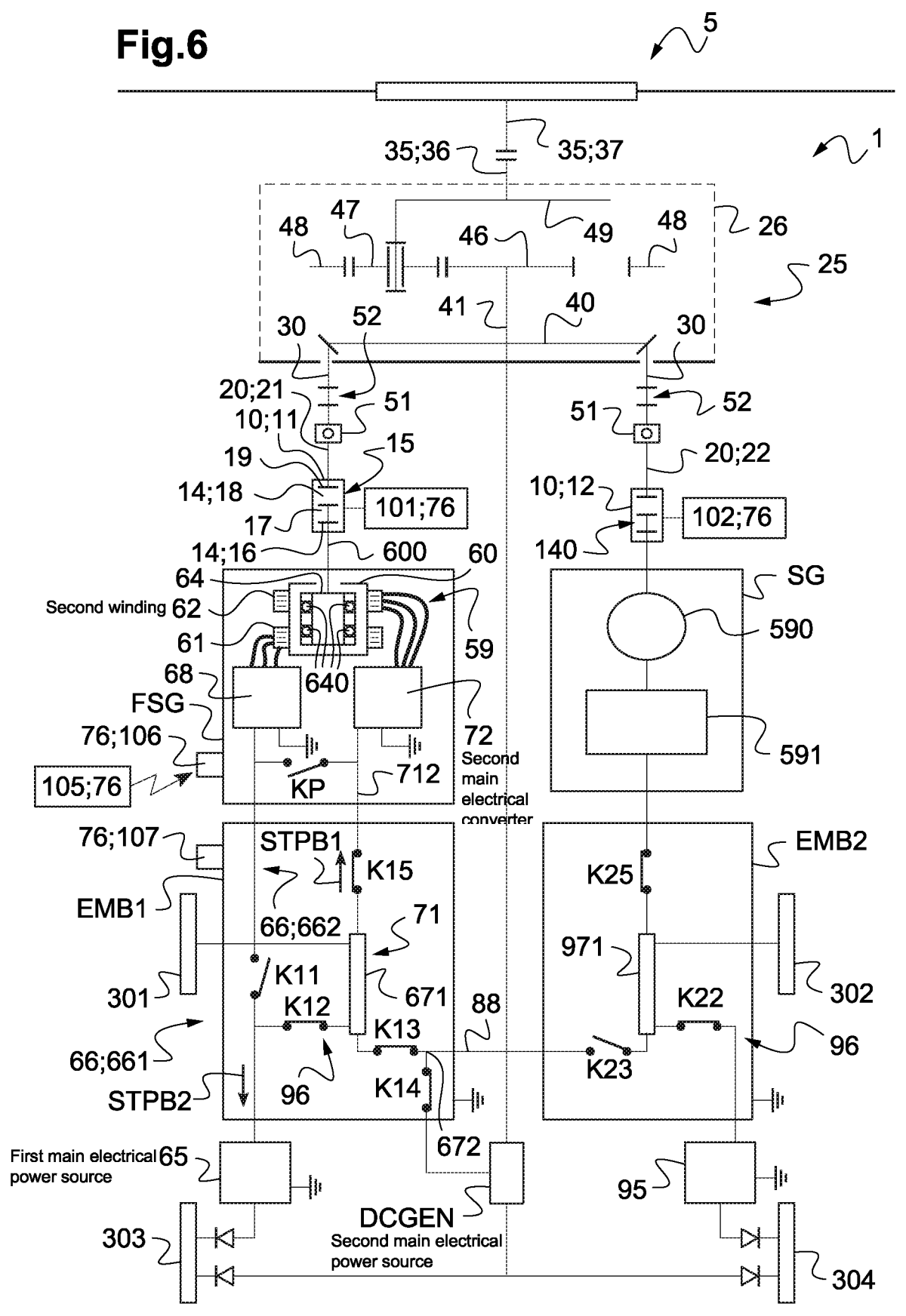
Figure 7:
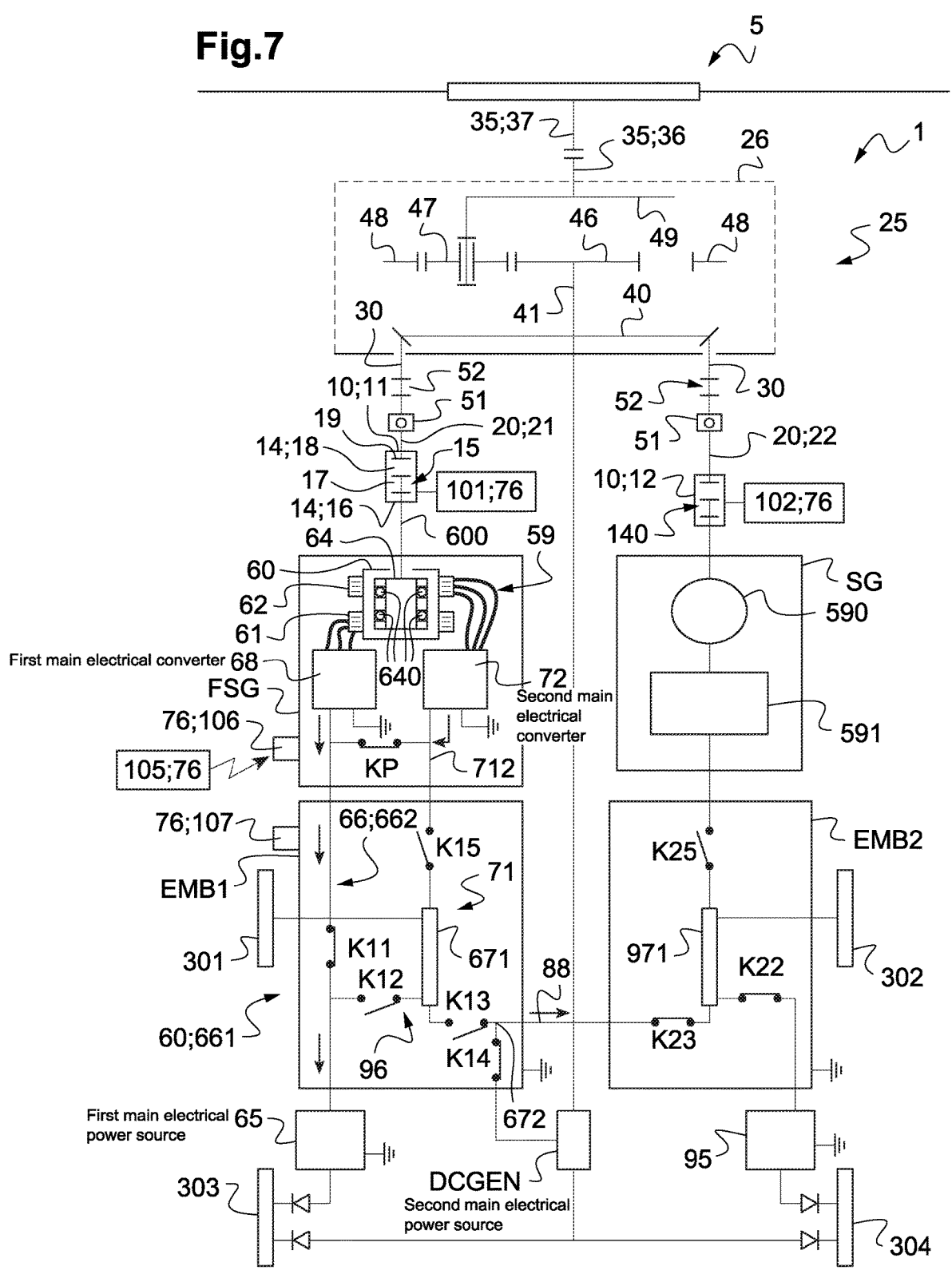
FIG. 7 shows the starting and electrical generation system of FIG. 1 during an electrical power production mode.

FIGS. 5 to 7 illustrate various operating modes of this first variant of the starting and electrical generation system 55 of the disclosure.

FIG. 5 illustrates the starting and electrical generation system 55 of the first variant during a starting mode MODRAP. The controller 76 is configured, during a step STPA1, to electrically power the first winding 61 via the first main electrical converter 68 with only the first main electrical power source 65. The controller 76 thus closes the first main contactor K11. In parallel, the additional engine 12 may be stopped or broken down, for example.

The controller 76 is also configured, during a step STPA2, to electrically power the second winding 62 via the second main electrical converter 72 with only the second main electrical power source DCGEN. The controller 76 thus closes the second main contactor K15, the third main contactor K13 and the sixth contactor K14.

The controller 76 is then also configured to control the main electrical machine FSG to operate in motor mode.

The controller 76 is optionally also configured to open the fourth main contactor K12 and the fifth main contactor KP in order to segregate the first main electrical power source 65 and the second main electrical power source DCGEN.

Under these conditions, the rapid restart of the main engine 11 is obtained by using two different electrical power sources 65, DCGEN to electrically power two electrical converters 68, 72 respectively.

FIG. 6 illustrates the starting and electrical generation system 55 of the first variant during a standby mode MOD-VEIL.

During this standby mode MODVEIL, the controller 76 is configured, during a step STPB1, to electrically power the second winding 62 via the second main electrical converter 72 with only the second main electrical power source DCGEN. The controller 76 thus closes the second main contactor K15, the third main contactor K13 and the sixth contactor K14, and opens the first main contactor K11 as well as the fifth main contactor KP. The controller 76 is then also configured to control the main electrical machine FSG to operate it in motor mode MOT, for example to maintain the main moving assembly 14 at a predetermined speed of rotation, the combustion chamber 17 being switched off or supplied with fuel. In parallel, the additional engine 12 can operate normally to set in motion the mechanical system 25, and the additional electrical machine SG can operate in generator mode MODGEN.

The controller 76 is also configured, during a step STPB2, to maintain the first main electrical power source 65 under load by electrically powering the first electrical connection 66 with the second main electrical power source DCGEN. The controller 76 thus closes the fourth main contactor K12.

FIG. 7 illustrates the starting and electrical generation system 55 of the first variant during an electrical power production mode MODPROD.

During this electrical power production mode MOD-PROD, the controller 76 is configured, during a step STPC1, to electrically disconnect the second main electrical power source DCGEN from the main electrical machine FSG. The controller 76 thus opens the second main contactor K15 and the third main contactor K13.

The controller 76 is also configured, during a step STPC2, to electrically connect the second main electrical converter 72 to the first main electrical converter 68 in parallel, and to connect them to the first main electrical power source 65. The controller 76 thus closes the fifth main contactor KP and the first main contactor K11, and opens the fourth main contactor K12. The controller 76 optionally closes the sixth contactor K14 and the third additional contactor K23.

The controller 76 is then also configured to control the main electrical machine FSG in order to operate in generator mode GEN. The first and second main electrical converters 68, 72 then deliver electrical power to the first main electrical connection 66. The second main electrical power source DCGEN electrically powers the essential on-board network 303.

Figure 8:
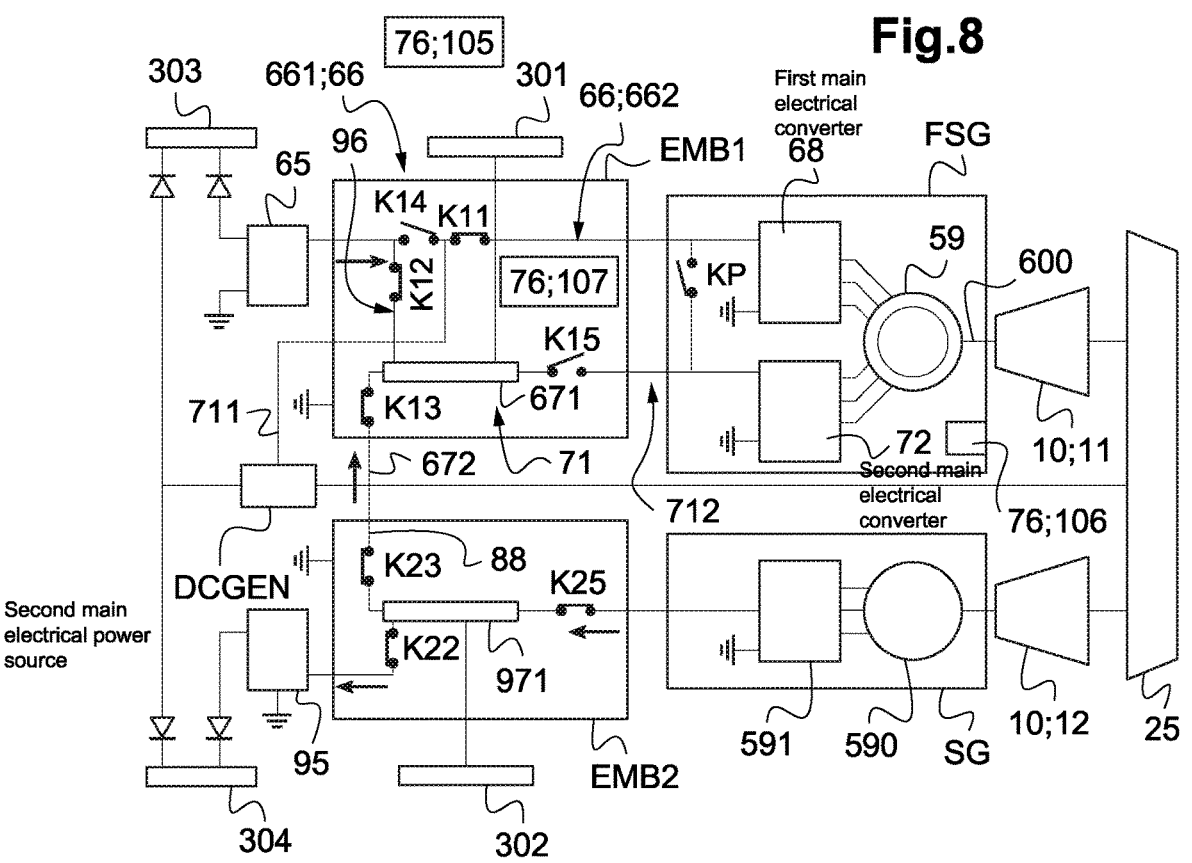
FIG. 8 shows a starting and electrical generation system with electrical power sources in parallel during standby mode.
Figure 9:
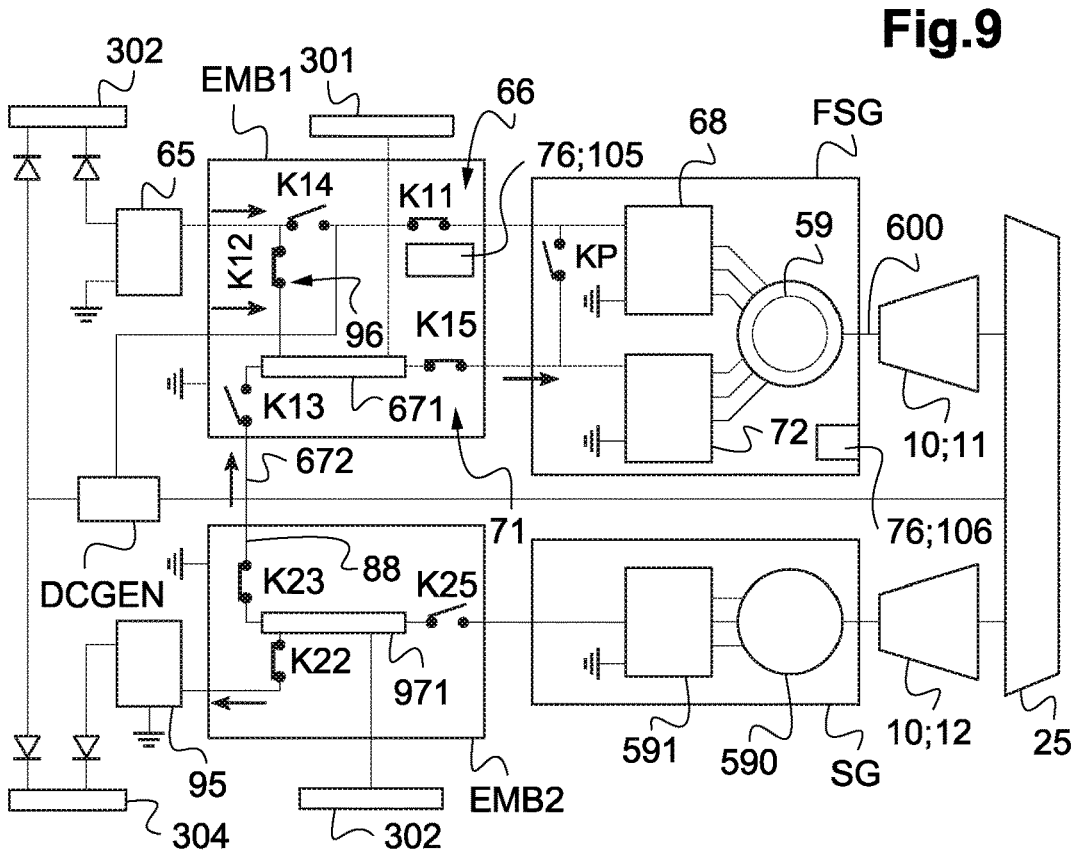
FIG. 9 shows the starting and electrical generation system of FIG. 8 during a starting mode.
Figure 10:
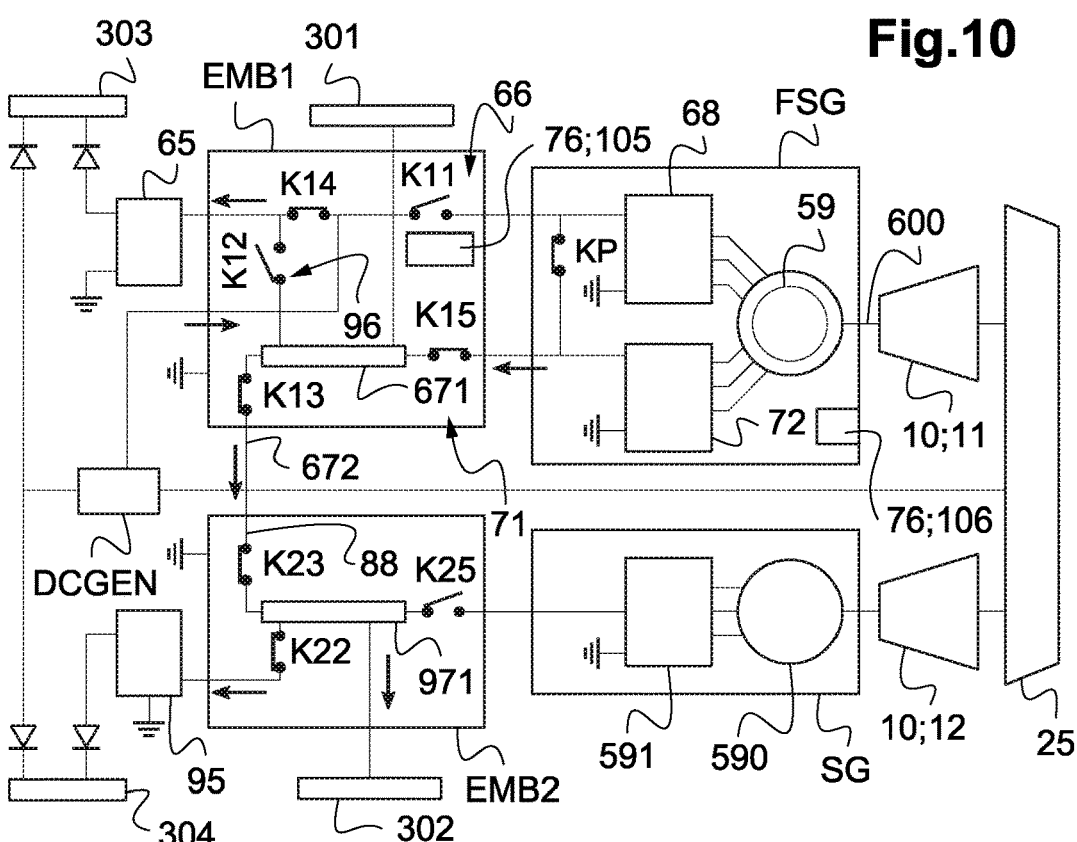
FIG. 10 shows the starting and electrical generation system of FIG. 8 during an electrical power production mode.

FIGS. 8 to 10 illustrate a second variant.

Compared to the first variant, the sixth contactor K14 is displaced. According to the second variant and with reference to FIG. 8, the first upstream wired connection 661 comprises the sixth contactor K14, the transverse electrical connection 96 being connected to the first upstream wired connection 661 between the first main electrical power source 65 and this sixth contactor K14.

In addition, the third main contactor K13 is arranged between the main bus 671 and the complementary electrical connection 88.

Finally, an intermediate wired electrical connection extends from the second upstream wired connection 711 to the first upstream wired connection 661, between the sixth contactor K14 and the first main contactor K11. For example, the second upstream wired connection 711 comprises a connection, between the main bus 671 and the second main electrical power source DCGEN, connected to the transverse electrical connection 96 and to the intermediate wired electrical connection.

During the standby mode MODVEIL shown in FIG. 8, the controller 76 is configured to electrically power the first winding 61 via the first main electrical converter 68 with the second main electrical power source DCGEN. The controller 76 thus closes the first main contactor K11 and opens the second main contactor K15, the sixth contactor K14, and the fifth main contactor KP.

The controller 76 is then also configured to control the main electrical machine FSG in order to operate it in motor mode MOT, for example to maintain the main moving assembly 14 at a predetermined speed of rotation, the combustion chamber 17 being switched off or supplied with fuel. In parallel, the additional engine 12 can operate normally to set in motion the mechanical system 25, and the additional electrical machine SG can operate in generator mode MODGEN.

The controller 76 is also configured to maintain the first main electrical power source 65 under load by electrically powering the first electrical connection 66 with the second main electrical power source DCGEN. The controller 76 thus closes the fourth main contactor K12. Optionally, the controller 76 also closes the third main contactor K13.

FIG. 9 illustrates the starting and electrical generation system 55 of the second variant during a starting mode MODRAP. The controller 76 is configured to electrically power the first winding 61 via the first main electrical converter 68 with the first main electrical power source 65 and the second main electrical power source DCGEN, and to electrically power the second winding 62 via the second main electrical converter 72 with the first main electrical 65 and the second main electrical power source DCGEN.

The controller 76 thus closes the first main contactor K11, the fourth main contactor K12 and the second main contactor K15. In parallel, the controller 76 opens the third main contactor K13, the sixth contactor K14 and the fifth main contactor KP.

FIG. 10 illustrates the starting and electrical generation system 55 of the second variant during an electrical power production mode MODPROD.

During this electrical power production mode MODPROD, the controller 76 is configured to electrically connect the second main electrical converter 72 in series with the first main electrical converter 68, and connect them to the first main electrical power source 65. Likewise, the second main electrical power source DCGEN can electrically power the secondary on-board electrical network 301. The controller 76 thus closes the fifth main contactor KP, the second main contactor K15, the sixth contactor K14, or even the third main contactor K13, and opens the fourth main contactor K12 and the first main contactor K11.

Thus, the secondary on-board electrical network 301 and the first main electrical power source 65 can be electrically powered by the converters 68, 72 and the second main electrical power source DCGEN.

Naturally, the present disclosure may be subjected to numerous variations as to its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A starting and electrical generation system for a main combustion engine of an aircraft, the starting and electrical generation system comprising a starter-generator provided with a transmission shaft, the starter-generator being operable in a motor mode for setting in motion a main moving assembly of the main combustion engine with the transmission shaft, and a generator mode for generating electrical power by having the transmission shaft set in motion by the main moving assembly, the starter-generator comprising a first winding that is polyphase and a second winding that is polyphase generating magnetic fields to create respective motor torques jointly setting in motion the transmission shaft in a starting mode of the motor mode, the starting and electrical generation system comprising a first main electrical power source connected on command by a first electrical connection to at least one first main electrical converter electrically connected to the first winding, and a second main electrical power source connected on command by a second electrical connection to at least one second main electrical converter electrically connected to the second winding, wherein the starting and electrical generation system comprises a manager configured to:

in the starting mode, electrically power the first winding via the first main electrical converter with at least the first main electrical power source, electrically power the second winding via the second main electrical converter with at least the second main electrical power source;

in a standby mode, power one of the first winding and second winding with the second main electrical power source, maintaining the first main electrical power source under load via a transverse electrical connection connected to the second electrical connection; and in an electrical power production mode, electrically connect, in parallel, the second main electrical converter and the first main electrical converter to electrically power the first main electrical power source.

2. The starting and electrical generation system according to claim 1, wherein the first main electrical power source is not voltage regulated and the second main electrical power source is voltage regulated or the first main electrical power source and the second main electrical power source are regulated to different voltages.

3. The starting and electrical generation system according to claim 1, wherein the first main electrical power source comprises at least one electric battery or one thermal battery or one supercapacitor.

4. The starting and electrical generation system according to claim 1, wherein the second main electrical power source comprises a voltage-regulated electrical generator that is configured to be mechanically set in motion by a mechanical system.

5. The starting and electrical generation system according to claim 1, wherein the starter-generator comprises an electrical machine having a stator provided with the first winding and the second winding that are polyphase, with floating neutral and galvanically insulated from each other, the electrical machine comprising a rotor with buried permanent magnets, having variable reluctance and constrained to rotate with the transmission shaft.

6. The starting and electrical generation system according to claim 1, wherein the starter-generator includes a dual electrical machine with separate excitations, the dual electrical machine with separate excitations comprising a stator provided with the first winding and the second winding, the dual electrical machine with separate excitations comprising a rotor provided with two rotor windings that are electrically connected to an electrical brush commutator.

7. The starting and electrical generation system according to claim 1, wherein the starter-generator comprises a magnet starter and an electrical machine operating in generator mode and in motor mode, the magnet starter being provided with a first stator having the first winding and with a first rotor that is mechanically connected to the transmission shaft by a freewheel, the electrical machine comprising a second stator provided with the second winding and with a second rotor integral with the transmission shaft, the electrical machine being able to be an electrical machine with separate or asynchronous excitation.

8. The starting and electrical generation system according to claim 1, wherein the starter-generator comprises a dual asynchronous electrical machine comprising a stator provided with the first winding and the second winding.

9. The starting and electrical generation system according to claim 1, wherein the starter-generator comprises a separately excited electrical machine comprising a stator having one of the first winding and the second winding, and an asynchronous electrical machine comprising a stator having the other of the first winding and the second winding.

10. The starting and electrical generation system according to claim 1, wherein the second electrical connection comprises a main bus, and the manager comprises:

a controller;

a first main contactor commanded by the controller and arranged on the first electrical connection; and a second main contactor commanded by the controller and arranged on the second electrical connection between the main bus and the second main electrical converter.

11. The starting and electrical generation system according to claim 10, wherein the manager comprises:

a third main contactor commanded by the controller and arranged between the main bus and a connection configured to be electrically connected to a complementary electrical connection of an additional electrical circuit;

a fourth main contactor commanded by the controller and arranged on the transverse electrical connection, the transverse electrical connection extending from the second electrical connection to the first electrical connection between the first main contactor and the first main electrical power source; and a fifth main contactor commanded by the controller and arranged on an electrical line connecting the first electrical connection and the second electrical connection between, firstly, the second main contactor and the second main electrical converter and, secondly, between the first main contactor and the first main electrical converter.

12. An aircraft provided with a main combustion engine and with at least one additional combustion engine connected to a mechanical system setting in motion at least one rotary wing or one rotor or one propeller, the additional combustion engine being connected to an additional electrical machine that can operate according to a motor mode for setting in motion an additional moving assembly of the additional combustion engine and a generator mode for generating electrical power by being set in motion by the additional moving assembly, the additional electrical machine being electrically connected to an additional electrical converter that is connected by an additional electrical connection to an additional electrical power source, wherein the aircraft comprises the starting and electrical generation system according to claim 1 for the main combustion engine.

13. The aircraft according to claim 12, wherein the mechanical system comprises a gearbox connected to the main combustion engine and to the additional combustion engine, and the second main electrical power source is set in motion by the gearbox.

14. A method for starting a combustion engine and generating electrical power with the starting and electrical generation system according to claim 1, wherein the method comprises:

the starting mode comprising the following steps: electrically powering the first winding via the first main electrical converter with at least the first main electrical power source, electrically powering the second winding via the second main electrical converter with at least the second main electrical power source;

the starting standby mode comprising the following steps: powering one of the first winding and second winding with the second main electrical power source and maintaining the first main electrical power source under load via the transverse electrical connection connected to the second electrical connection; and the electrical power production mode comprising the following steps: electrically connecting, in parallel, the second main electrical converter and the first main electrical converter and connecting the second main electrical converter and the first main electrical converter to the first main electrical power source.

15. A starting and electrical generation system for a main combustion engine of an aircraft, the starting and electrical generation system comprising:

a starter-generator having a transmission shaft, the starter-generator being configured to operate in a motor mode in which the transmission shaft transmits torque to a main moving assembly of the main combustion engine, and a generator mode in which electrical power is generated when the transmission shaft is driven by the main moving assembly, the starter-generator comprising a first polyphase winding and a second polyphase winding, each configured to generate electromagnetic torque, the torques collectively driving the transmission shaft during a starting operation, the starting and electrical generation system comprising a first main electrical power source selectively connectable by a first electrical connection to a first main electrical converter electrically connected to the first polyphase winding, and a second main electrical power source selectively connectable by a second electrical connection to a second main electrical converter electrically connected to the second polyphase winding, wherein the starting and electrical generation system comprises control circuitry including a controller and switching elements, the control circuitry being configured such that:

during operation in a starting mode, the control circuitry causes electrical power from the first main electrical power source to be supplied to the first polyphase winding via the first main electrical converter, and causes electrical power from the second main electrical power source to be supplied to the second polyphase winding via the second main electrical converter;

during operation in a standby mode, the control circuitry causes electrical power from the second main electrical power source to be supplied to one of the first polyphase winding and second polyphase winding, and causes the first main electrical power source to be maintained under load via a transverse electrical connection connected to the second electrical connection; and during operation in an electrical power production mode, the control circuitry causes the first main electrical converter and the second main electrical converter to be electrically connected in parallel to supply electrical power to the first main electrical power source.

16. The starting and electrical generation system of claim 15, wherein the switching elements comprise one or more electrically actuated contactors arranged to selectively open and close the first electrical connection and the second electrical connection.

17. The starting and electrical generation system of claim 15, wherein the main moving assembly comprises one or more compression turbines mechanically coupled in rotation to one or more expansion turbines of the main combustion engine.

18. An aircraft comprising the starting and electrical generation system of claim 15, the aircraft further comprising:

an additional combustion engine coupled to a power transmission system configured to drive at least one of a rotary wing, a rotor, or a propeller; and an additional electrical machine coupled to the additional combustion engine and configured to operate (i) in a motor mode in which the additional electrical machine applies torque to an additional rotating assembly of the additional combustion engine and (ii) a generator mode in which the additional electrical machine generates electrical power when driven by the additional rotating assembly, wherein the additional electrical machine is electrically coupled by an additional electrical converter, and wherein the additional electrical converter is coupled by an additional electrical connection to an additional electrical power source.

19. The starting and electrical generation system of claim 18, wherein the power transmission system comprises a gearbox mechanically coupled to the main combustion engine and the additional combustion engine.

20. The starting and electrical generation system of claim 18, wherein the additional rotating assembly comprises one or more compression turbines mechanically coupled in rotation to one or more expansion turbines of the additional combustion engine.

* * * * *